(12) United States Patent
McDonald et al.

(10) Patent No.: US 8,925,102 B2
(45) Date of Patent: *Dec. 30, 2014

(54) SYSTEM AND METHOD OF GENERATING ENCRYPTION/DECRYPTION KEYS AND ENCRYPTING/DECRYPTING A DERIVATIVE WORK

(75) Inventors: Omid Allen McDonald, Ottawa (CA); David Ross McDonald, Ottawa (CA); David Robert Cuddy, Ottawa (CA)

(73) Assignee: Legitmix, Inc., Ottawa, Ontario (CA)

( * ) Notice: Subject to any disclaimer, the term of this patent is extended or adjusted under 35 U.S.C. 154(b) by 412 days.

This patent is subject to a terminal disclaimer.

(21) Appl. No.: 12/925,103

(22) Filed: Oct. 14, 2010

(65) Prior Publication Data

US 2012/0096262 A1    Apr. 19, 2012

(51) Int. Cl.
    *G06F 7/04*    (2006.01)
    *H04L 9/08*    (2006.01)

(52) U.S. Cl.
    CPC ............ H04L 9/0866 (2013.01); H04L 9/0822 (2013.01); H04L 9/0894 (2013.01); *H04L 2209/34* (2013.01); *Y10S 705/901* (2013.01)
    USPC .................. 726/27; 380/44; 726/26; 705/51; 705/57; 705/59; 705/901

(58) Field of Classification Search
    None
    See application file for complete search history.

(56) References Cited

U.S. PATENT DOCUMENTS

| | | | |
|---|---|---|---|
| 5,787,125 A * | 7/1998 | Mittel | 375/329 |
| 6,076,077 A | 6/2000 | Saito | |
| 7,351,904 B2 | 4/2008 | Tamori | |
| 8,131,737 B2 | 3/2012 | Ramer et al. | |
| 2003/0212886 A1 | 11/2003 | Sugiura | |
| 2004/0022444 A1 | 2/2004 | Rhoads | |
| 2004/0073789 A1 | 4/2004 | Powers | |
| 2004/0205028 A1 * | 10/2004 | Verosub et al. | 705/59 |
| 2005/0043960 A1 | 2/2005 | Blankley | |
| 2006/0013435 A1 | 1/2006 | Rhoads | |
| 2006/0112015 A1 | 5/2006 | Chancellor et al. | |
| 2006/0195512 A1 | 8/2006 | Rogers et al. | |
| 2006/0195516 A1 | 8/2006 | Beaupre | |
| 2006/0217828 A1 | 9/2006 | Hicken | |
| 2006/0253433 A1 | 11/2006 | Kim et al. | |

(Continued)

FOREIGN PATENT DOCUMENTS

| | | |
|---|---|---|
| EP | 1 146 714 A1 | 10/2001 |
| WO | WO 9714087 | 4/1997 |

(Continued)

OTHER PUBLICATIONS

Rump, N., "Can Digital Rights Management Be Standardized?", Mar. 2004, IEEE Signal Processing Magazine, p. 63-70.*

(Continued)

*Primary Examiner* — Alexander Lagor
(74) *Attorney, Agent, or Firm* — J. Bennett Mullinax, LLC

(57) ABSTRACT

A derivative work is encrypted using master keys generated from source data extracted from digital sources used to create the derivative work. A software application permits a mix artist to encrypt and stream a derivative work to a worldwide web server, where it is made available to consumers. A software application permits the consumers to acquire and decrypt an encrypted derivative work if the consumer has possession of a corresponding digital source for each of the digital sources used to encrypt the derivative work.

17 Claims, 6 Drawing Sheets

(56) References Cited

U.S. PATENT DOCUMENTS

| | | |
|---|---|---|
| 2007/0076798 A1* | 4/2007 | Imahashi et al. ......... 375/240.24 |
| 2007/0078876 A1 | 4/2007 | Hayashi et al. |
| 2007/0100806 A1 | 5/2007 | Ramer et al. |
| 2008/0209222 A1* | 8/2008 | Narayanaswami et al. ... 713/184 |
| 2008/0240444 A1 | 10/2008 | Shuster |
| 2009/0018898 A1 | 1/2009 | Genen |
| 2009/0077377 A1* | 3/2009 | Cobelo et al. ................. 713/165 |
| 2009/0182736 A1 | 7/2009 | Ghatak |
| 2009/0228423 A1 | 9/2009 | Hicken et al. |
| 2010/0014559 A1* | 1/2010 | Nieto et al. ................... 375/130 |
| 2012/0069131 A1 | 3/2012 | Abelow |

FOREIGN PATENT DOCUMENTS

| | | |
|---|---|---|
| WO | WO2006057639 A1 | 6/2006 |
| WO | WO 2007/091189 A2 | 8/2007 |
| WO | WO 2007091189 A2 * | 8/2007 |
| WO | WO2007091189 A2 | 8/2007 |
| WO | WO 2007/106798 A2 | 9/2007 |
| WO | WO 2008/004971 A1 | 1/2008 |
| WO | WO2011127564 A1 | 10/2011 |

OTHER PUBLICATIONS

RUMP (Mar. 2004) Can Digital Rights Management be Standardized? IEEE Signal Processing Magazine—pp. 63-70.

International Written Opinion PCT/CA2011/001098 mailed Dec. 21, 2011.

International Preliminary Report on Patentability; PCT/CA2011/001098; Legitmix, Inc. et al.; Apr. 27, 2012; Canadian Intellectual Property Office.

International Search Report and Written Opinoin; Legitmix, Inc. et al. issued by ISA/CA for PCT/CA2011/00384; Aug. 15, 2011 (7 pages).

* cited by examiner

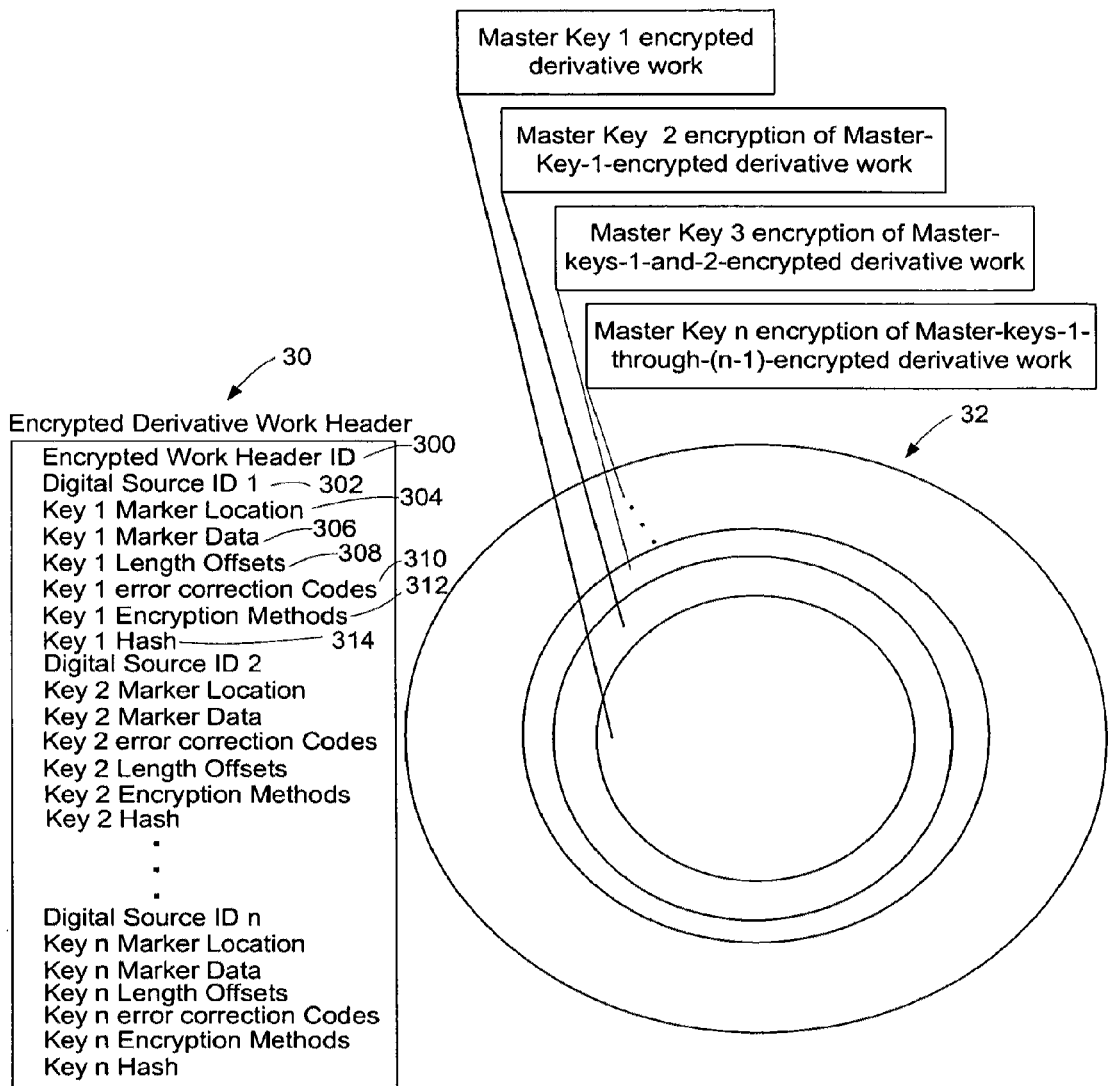

US 8,925,102 B2

SYSTEM AND METHOD OF GENERATING ENCRYPTION/DECRYPTION KEYS AND ENCRYPTING/DECRYPTING A DERIVATIVE WORK

RELATED APPLICATIONS

This is the first application filed for this invention.

FIELD OF THE INVENTION

This invention relates in general to the encryption of digital files and, in particular, to a system and method of generating encryption/decryption keys and encrypting/decrypting a derivative work.

BACKGROUND OF THE INVENTION

Applicant's U.S. patent application Ser. No. 12/760,091 filed Apr. 14, 2010, entitled "A System And Method Of Encrypting A Derivative Work Using A Cipher Created From Its Sources", the entire specification of which is incorporated herein by reference, describes a method of encrypting derivative works to permit the encrypted derivative works to be legally distributed to consumers.

As can be appreciated by those skilled in the art, there are certain challenges associated with the generation of encryption/decryption keys from source data. One challenge is associated with the variability of source data extracted from digital sources generated from the same source art work. Due to reproduction format, compression technique, etc. there is a significant likelihood that the digital source(s) used to generate the key(s) to encrypt a derivative work will be at least slightly different from the digital source(s) that must be used to generate the keys to decrypt that derivative work. It is incumbent upon the distributors of encrypted derivative works to ensure that the encrypted derivative works can only be decrypted using keys generated from digital sources generated from the same source art work as the digital sources used to encrypt the derivative works, and must also ensure that distribution of the decryption keys would be unlawful.

There therefore exists a need for a system and method of generating encryption/decryption keys and encrypting/decrypting a derivative work that addresses these issues.

SUMMARY OF THE INVENTION

It is therefore an object of the invention to provide a system and method of generating encryption/decryption keys and encrypting/decrypting a derivative work. It is a further object of the invention to ensure that each encryption and decryption key used to encrypt and decrypt a derivative work produces a human-cognizable version of the source art work with which those keys are respectively associated when the respective keys are converted to an a human-cognizable analog form by an appropriate reproduction device.

The invention therefore provides a method of encrypting a derivative work using encryption keys generated from digital sources used to create the derivative work, comprising: obtaining machine-readable input from a creator of the derivative work that identifies digital sources used to create the derivative work; extracting source data from each of the digital sources; selecting a portion of the source data to generate an encryption key associated with each digital source; generating the respective encryption keys using the respective selected portions of source data; and encrypting the derivative work by sequentially applying the respective encryption keys to the entire derivative work.

The invention further provides a system for encrypting and decrypting a derivative work, comprising: a derivative work service server connected to a public network and accessible by mix artists and consumers; a software application stored on respective computer systems operated by respective mix artists, the respective software applications comprising machine-executable code that permits a mix artist to upload a derivative work to the derivative work service server, which derivative work is encrypted using encryption keys generated using source data extracted from digital sources used by the mix artist to create the derivative work; and a software application stored on respective computer systems operated by respective consumers, the respective software applications comprising machine-executable code that permits a consumer to acquire and decrypt an encrypted derivative work, provided that the consumer is in possession of a digital source corresponding to each digital source used to encrypt the derivative work.

The invention yet further provides an encrypted derivative work, comprising a derivative work encrypted using encryption keys generated from source data extracted from digital sources used to create the derivative work, the respective encryption keys being applied in sequence to the entire derivative work to encrypt the derivative work.

BRIEF DESCRIPTION OF THE DRAWINGS

The embodiments of the present invention will now be described by reference to the following drawings, in which identical reference numerals in different figures indicate identical elements, and in which:

FIG. 6 is a diagram graphically illustrating an encrypted derivative work header in accordance with the invention;

FIG. 7 is a diagram graphically illustrating an encrypted derivative work in accordance with one embodiment of the invention;

DETAILED DESCRIPTION OF THE PREFERRED EMBODIMENTS

Figure 1:
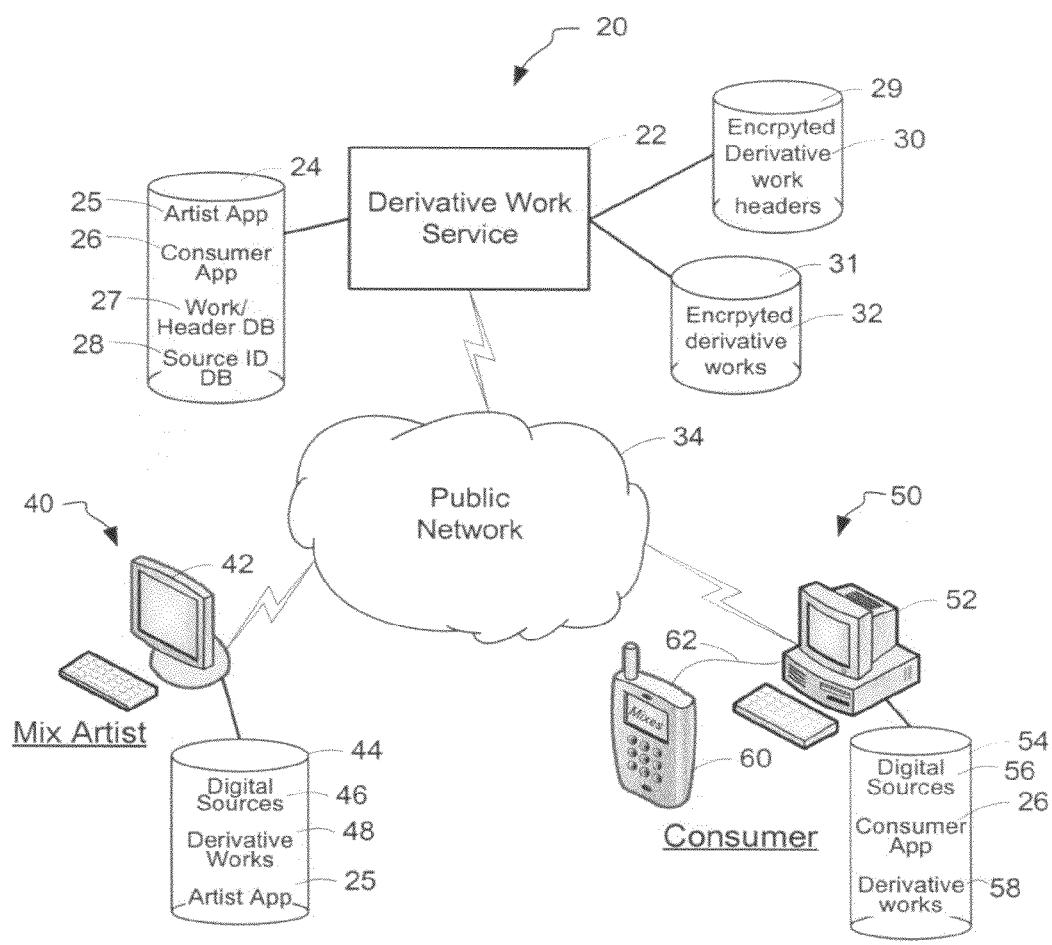
FIG. 1 is a schematic diagram of a system in accordance with one embodiment of the invention with exemplary users of the system.

The present invention provides a system and method of generating encryption and decryption keys derived from digital sources used to create a derivative work. The invention further provides a method of encrypting and decrypting the derivative work using those encryption and decryption keys. The encryption and decryption keys are created using digital source data and if the encryption or decryption keys are played through a reproduction device they reproduce a human recognizable version of that portion of the digital source from which the keys were generated. Consequently, unsanctioned distribution of any decryption key used to decrypt a derivative work encrypted in accordance with the invention is governed by the digital source's copyright. Furthermore, a method of multilayer encryption is used to encrypt the derivative work to ensure that all the digital sources generated from the same source art work as those used during encryption be present for decryption.

Definitions

As used herein, "source art work" means any audio work, video work, photographic work or mixed-media work in human-cognizable form which can be uniquely identified by title, artist, version, etc.

As used herein, "digital source" means a digital encoding of a source art work stored in any machine-readable format. There can be any number of digital sources for a given source art work.

As used herein, "source data" means a native, uncompressed digital encoding of a source art work extracted from a digital source. The source data for any source art work is substantially invariant, regardless of the digital source from which it is extracted.

As used herein, "derivative work" means any audio work, video work, photographic work or mixed-media work derived in whole or in part from one or more digital sources.

As used herein, a "mix artist" means any person or combination of persons who, directly or indirectly, creates a derivative work.

As used herein, "encrypted derivative work" means a derivative work that has been encrypted using encryption keys generated from the digital sources used to create the derivative work.

As used herein, "derivative work service" means a publically accessible internet service that operates to provide an online forum where mix artists can legally post their derivative works, and consumers can legally acquire those derivative works.

As used herein, "consumer" means any person or entity that acquires a derivative work from the derivative work service.

As used herein, "artist app" means machine-executable programme instructions that permit a mix artist to encrypt and upload a derivative work to the derivative work service where it becomes available for acquisition by a consumer.

As used herein, "consumer app" means machine-executable programme instructions that permit the consumer to acquire a derivative work from the derivative work service.

As used herein, "master key" means an encryption key generated from a digital source used by a mix artist to create a derivative work.

As used herein, "candidate key" means a decryption key generated from a digital source possessed by a consumer who acquires an encrypted derivative work.

System Overview:

FIG. 1 is a schematic diagram of a system 20 in accordance with one embodiment of the invention. A principal component of the system 20 is a worldwide web server 22 that supports a derivative work service in accordance with the invention, hereinafter referred to as the derivative work service server 22. The derivative work service server 22 is supplied with non-volatile memory, for example one or more hard disks 24, 29, 31. The non-volatile memory is used to store the artist app 25 and the consumer app 26, which will be described below in more detail. The artist app 25 and the consumer app 26 may also be combined in a computer-executable code module having features used by both the artist and the consumer, as a matter of design choice. The artist app 25 and the consumer app 26 may be available for download via a public network 34 by both mix artists and consumers; embedded in or associated with a computer operating system or an online music service; provided with a personal computing, entertainment or communications device; or made available to the mix artist and the consumer in any other way on a fee-based, gratis or bundled basis. The non-volatile memory 24, 29, 31 is also used to store encrypted versions 32 of derivative works created by mix artists and uploaded to the derivative work service server 22 using the mix artist's app 25, as will also be explained below in more detail. Each encrypted derivative work 32 is associated with an encrypted derivative work header 30. The association between the encrypted derivative work header 30 and the encrypted derivative work is stored in an encrypted derivative work/header database 27, as will be explained below in more detail. As will also be explained below in more detail, an identification (digital source ID) of each digital source identified by a mix artist as having been used to create a derivative work is stored in the encrypted derivative work header 30. A digital source ID database 28 is used to translate those digital source IDs into information (title, artist, album, or the like) that is used to locate a corresponding digital source when decryption is performed, as will also be explained below in more detail.

A mix artist 40 uses a mix artist's system 42, a personal computer for example having a non-volatile memory 44, to create derivative works 48 from one or more digital sources 46 using tools and/or methods that are known in the art. Once a derivative work 48 has been created, the mix artist 40 may use features of the artist app 25 to upload the derivative work 48 to derivative work service server 22 via a public network 34. The upload process creates an encrypted derivative work 32, which is stored by the derivative work service server 22. In accordance with one embodiment of the invention, the encrypted derivative work 32 does not persist on the mix artist's system 42, and the original derivative work 48 is unaffected and untransformed by the upload operation.

A consumer 50 uses a consumer's system 52, a personal computer for example having a non-volatile memory 54, to run the consumer app 26. The consumer 50 uses consumer app 26 to browse and acquire encrypted derivative works 32 made available on the derivative work service server 22. If the consumer 50 indicates an intention to acquire an encrypted derivative work 32 from the derivative work service server 22, the consumer app 26 verifies, with assistance from the consumer 50 if required, that the non-volatile memory 54 stores each digital source 56 required to decrypt the encrypted derivative work 32, i.e. a digital source produced from the same source art work(s) used to create the encrypted derivative work 32. There is no requirement that the digital source 56 possessed by the consumer 50 be an exact duplicate of the digital source 46 used by the mix artist 40 to encrypt the derivative work 48, since some minor differences between two digital sources produced from the same source art work may exist due to storage media type, compression type, etc. However, the digital source(s) identified by the mix artist 40 must be identifiable among the digital sources 56 possessed by the consumer 50 and they must generate decryption keys that match those created during encryption. If one or more of the digital sources 56 is not available from the non-volatile memory 54, an option to purchase or otherwise obtain those missing digital source(s) is presented using technology known in the art. When a digital source 56 corresponding to each digital source 46 used to encrypt the derivative work 48 is available on the non-volatile memory 54, the consumer app 26 downloads the encrypted derivative work from the derivative work service server 22, decrypts the encrypted derivative work 32 and stores the decrypted derivative work 58 in memory 54, as will be explained below in detail. The encrypted derivative work 32 does not persist on the consumer's system 52. The derivative work 58 is then available to the consumer 50, and may be played/viewed using the consumer's system 52, or any other personal device 60 to which the derivative work 58 is communicated using a communications link 62, which may be a tether, Bluetooth® connection, or the like.

Figure 2:
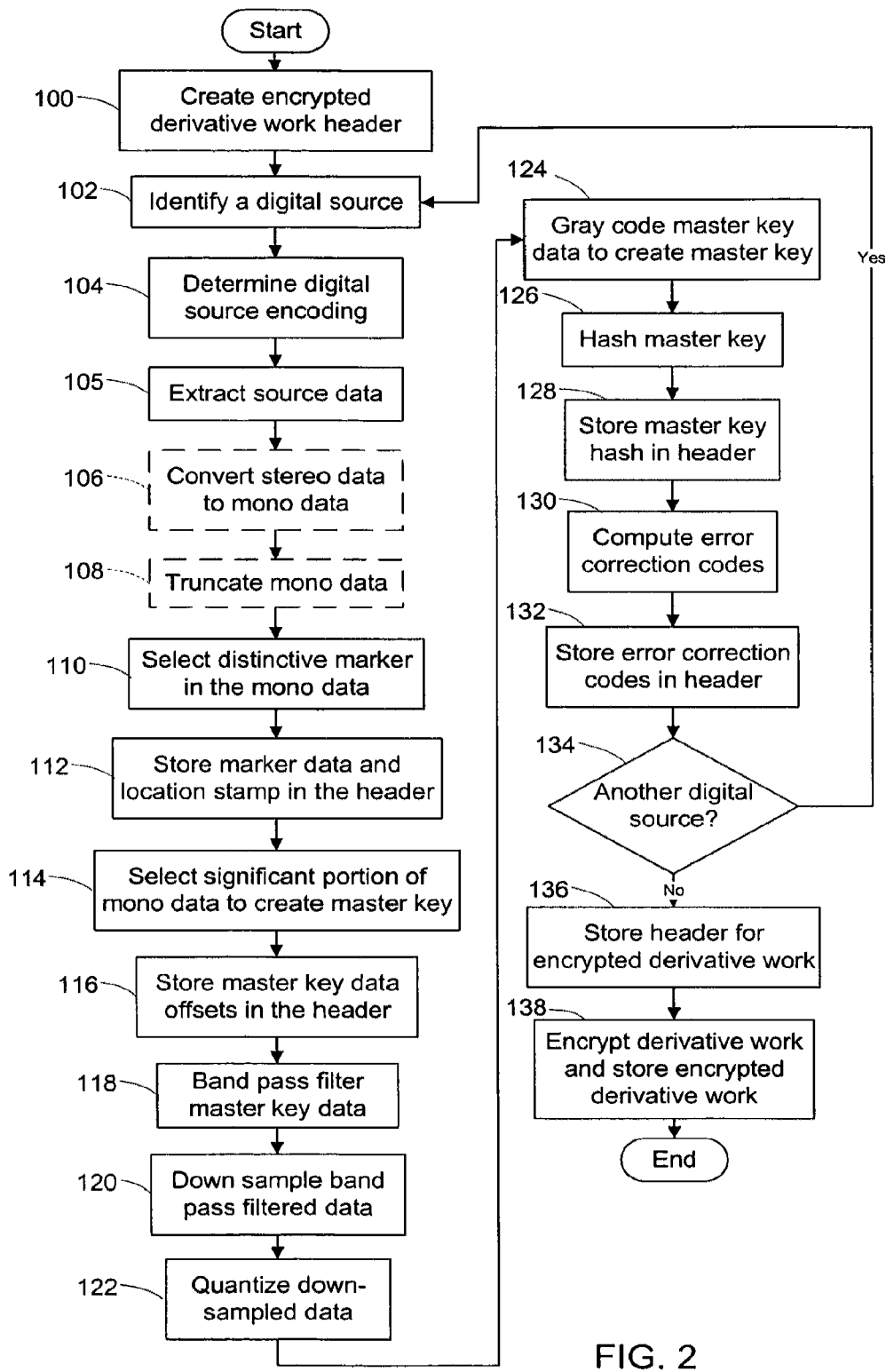
FIG. 2 is a flow chart illustrating principal steps in accordance with one embodiment of the invention of a method of generating encryption keys and encrypting a derivative work.

Encryption Key Generation:

FIG. 2 is a flow chart characterizing principal steps performed to encrypt a derivative work 48 to create an encrypted derivative work 32 in accordance with one embodiment of the invention, which is explained by way of example only with reference to audio source art works. As understood by those skilled in the art, audio source art works generally contain source data in pulse code modulated (PCM) format.

The process begins by creating a header for the encrypted derivative work (100) which will be populated with information about the encrypted derivative work as that information is accumulated, as will be explained below in more detail with reference to FIG. 6. Once the encrypted derivative work header is created, the mix artist 40 is prompted by the mix artist's app 25 to identify (102) a digital source used to create the derivative work. The source encoding used to create that digital source is determined (104) using techniques that are well known in the art. The source data is then extracted (105) from the digital source using methods known in the art. Once the source data is extracted, it is converted (106) to mono data unless the digital source data happens to be mono data. If the source data is in stereo, the conversion to mono is accomplished by computing an average of the stereo data pairs. In accordance with one embodiment of the invention, the mono data is then truncated (108) to remove a small portion of the data at the beginning and the end of the mono data. This is an optional step. In some instances the truncation helps compensate for differences in the mono data generated from digital sources created using different encoding and/or compression techniques.

The mono data is then examined (110) to identify a distinctive data sequence that will serve as a marker for key regeneration by subsequent decryption processes, as will be described below with reference to FIG. 8. After the marker is selected, a copy of the marker, or an encoded representation thereof, and a location stamp that indicates the location of the marker in the mono data is stored (112) in the header. A significant portion of the mono data is then selected (114) to be used to create a master key. The "significant portion" means at least one half of the mono data, though this is not a requirement for successful practice of the invention. Master key data offsets with respect to the marker are stored (116) in the encrypted derivative work header 30. As will be explained below with reference to FIGS. 3-5, the relationship between the location of the master key data and the location of the marker is not fixed and no general rule applies. The marker simply serves a reference point to locate the key data during subsequent decryption processes. After the master key data has been selected, it is band pass filtered (118) to remove low and high frequency components. In one embodiment, the band pass filter removes components below 300 Hz and above 2000 Hz, though a different frequency range can also be used. The band pass filtered data is then down sampled (120) using a decimation filter which retains every Nth sample in the sequence (N being the order of the filter), and discarding the intervening N-1 samples. In one embodiment, a 10-to-1 decimation filter is applied, reducing the sampling rate from 44,100 samples per second to 4410 samples per second. In this embodiment, down sampling reduces the size of the source data by an order of 10, but other decimating filters can also be used.

The down sampled data is then quantized (122) by reducing a resolution of the down sampled data while retaining its essential reproduction characteristics. In one embodiment, a 3-bit linear quantizer is used. The 3-bit linear quantizer reduces the resolution from 16 bits per sample to 3 bits per sample. Other types of quantizers, such as non-linear quantizers and adaptive quantizers are known to those skilled in the art, and may also be used for the same purpose. Likewise a quantizer with a different resolution can also be used. The quantized data is then optionally Gray coded (124) to minimize a density of bit reversals that may result from the quantizing. Although the processes 118-124 have been described sequentially for the sake of simplicity, those skilled in the art will realize that two or more of these processes may be combined to improve efficiency and performance.

The quantized (and optionally Gray coded) data is a master key generated from the digital source. The master key is hashed (126) using any convenient hashing algorithm. In one embodiment the hashing algorithm is SHA-1, which yields a hash that is 20 bytes long. The master key hash is stored (128) in the encrypted derivative work header 30. As will be understood by those skilled in the art, decryption keys subsequently generated from different digital sources may not exactly match the master key even though those digital sources were all created from the same source artwork. To address this, error correction codes are computed (130). Systematic error correction codes are used so that small differences between the master key and candidate key can be corrected. In one embodiment the master key is processed using a Low Density Parity Coder (LDPC) in order to create the error correction codes, but other methods of generating error correction codes can also be used. The resulting error correction codes are stored (132) in the encrypted derivative work header 30. The mix artist is then prompted to determine (134) if another digital source was used to create the derivative work 48, i.e. a master key has now been generated for each digital source used to create the derivative work 48. If the mix artist 40 identifies another digital source, the process repeats from (102). If not, the header is encrypted, uploaded and stored (136) by the derivative work service server 22. In one embodiment, for the purpose of security the encrypted derivative work header 30 is not stored on the same device as the encrypted derivative work 32, and may be stored on another network device known only to the derivative work service server 22.

After all of the master encryption keys have been generated, the derivative work is encrypted using the master keys and streamed to the derivative work service server 22, which stores (138) the encrypted derivative work 32. As will be explained below with reference to FIGS. 6 and 7, in one embodiment a "layered" encryption of the derivative work is performed to ensure that all the digital sources corresponding to those used during encryption be present for decryption.

Figure 3:
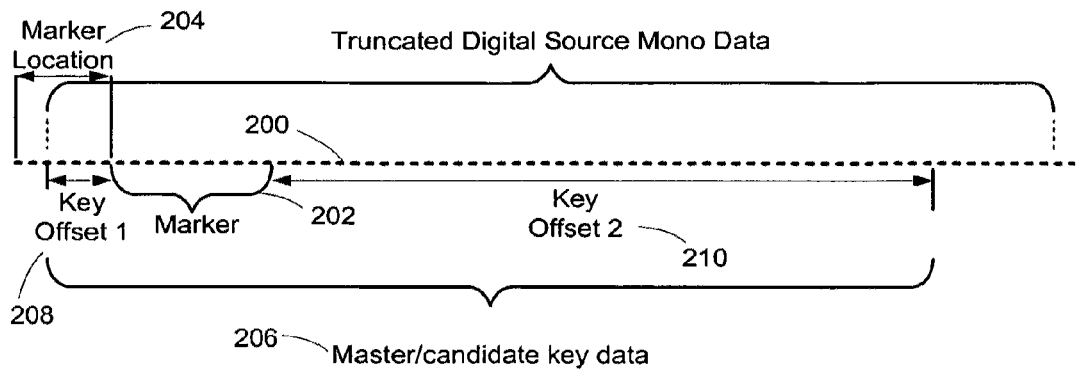
FIG. 3 is a diagram graphically illustrating a first example of the selection of encryption/decryption key data in accordance with one embodiment of the invention.

FIG. 3 is a diagram graphically illustrating a first example of the selection of master/candidate key data in accordance with one embodiment of the invention. In this example digital source mono data 200 is examined to select a distinctive marker 202. The marker is used as a reference point to determine the location of master/candidate key data 206 in a digital source possessed by the consumer 50 when an encrypted derivative work is to be decrypted. As will be understood by those skilled in the art, there may be many distinctive data sequences in the mono data 200 that can be used as the marker 202. The marker need only be distinctive within a limited range of the source data to permit the marker to be located in the source data extracted from the corresponding digital source when the encrypted derivative work is to be decrypted. The marker location stamp (204) is determined by computing an offset of the marker 202 from the beginning of the digital source mono data 200. In one embodiment the marker location stamp is stored in the encrypted derivative work header 30 as a number of PCM samples from the beginning of the digital source mono data 200. The master/candidate key data 206 is then selected. In this example, the marker 202 is part of the master/candidate key data 206, but this is a matter of choice. In one embodiment the master/candidate key data is at least about half of the digital source mono data 200, but this is also a matter of choice. Once the master/candidate key data 206 has been selected, its total length (in PCM samples, for example) is computed and its relation to the marker 202 is determined. In this example, the offsets for the master/candidate key data 206 are stored as first and second offsets. Key offset 1 (208) measured in PCM samples is stored as a negative value (not shown) to indicate that the master/candidate data 206 begins before the first byte of the marker 202 data, and key offset 2 (210) is stored as a positive value to indicate that the encryption decryption key data 206 ends n PCM samples after an end of the marker 202 data. It should be noted that offset 1 (208) and a key length can alternatively be stored.

Figure 4:
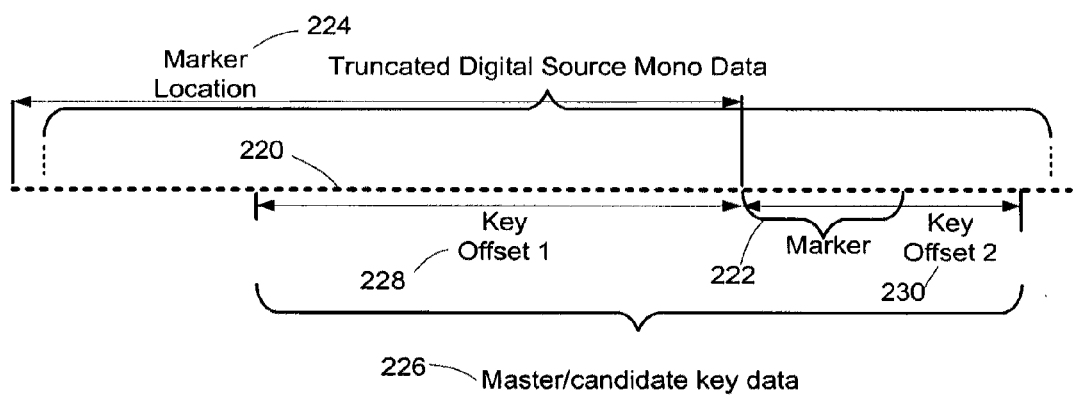
FIG. 4 is a diagram graphically illustrating a second example of the selection of encryption/decryption key data in accordance with one embodiment of the invention.

FIG. 4 is a diagram graphically illustrating a second example of the selection of master/candidate key data 226 in accordance with one embodiment of the invention. In this example, a marker 222 is located near an end of the digital source mono data 220. As described above, the marker location stamp 224 is stored in PCM samples from a beginning of the digital source mono data 220. In this example, the offsets for the master/candidate key data 226 are computed from a beginning of the marker 222 and stored as key offset 1 (228) (a negative value) and key offset 2 (230) (a positive value. It should be noted that key offset 1 (228) and a key length can alternatively be stored.

Figure 5:
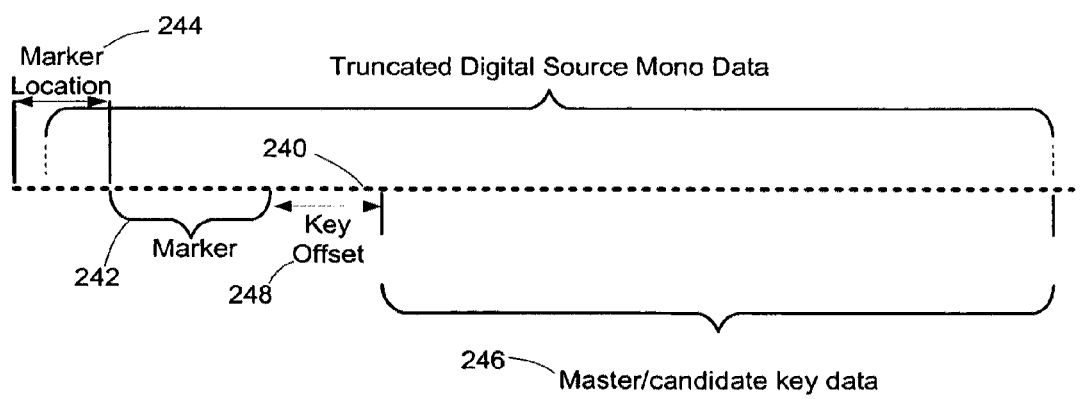
FIG. 5 is a diagram graphically illustrating a third example of the selection of encryption/decryption key data in accordance with one embodiment of the invention.

FIG. 5 is a diagram graphically illustrating a third example of the selection of master/candidate key data 246 in accordance with one embodiment of the invention. In this example, the marker 242 is located near a beginning of digital source mono data 240. The master/candidate key data 246 begins after an end of the marker and the key offset 248 is stored as a positive value, with a key length in PCM samples.

It should be noted that the three examples of master/candidate key data selection are not exhaustive, and that the positional relationship between the marker and the master/candidate key data is unimportant, as is the convention used to record that relationship in the encrypted derivative work header 30.

FIG. 6 is a schematic diagram visually illustrating an example of the encrypted derivative work header 30 in accordance with the invention. As explained above, when the encrypted derivative work header 30 is created it is assigned an encrypted work header ID 300 that is passed to the mix artist's app 25 by the work service server 22. The encrypted work header ID is also stored by the derivative work service server 22 in the encrypted derivative work header database 27 in association with an identification code (not shown) uniquely associated with the encrypted derivative work 32.

Figure 8:
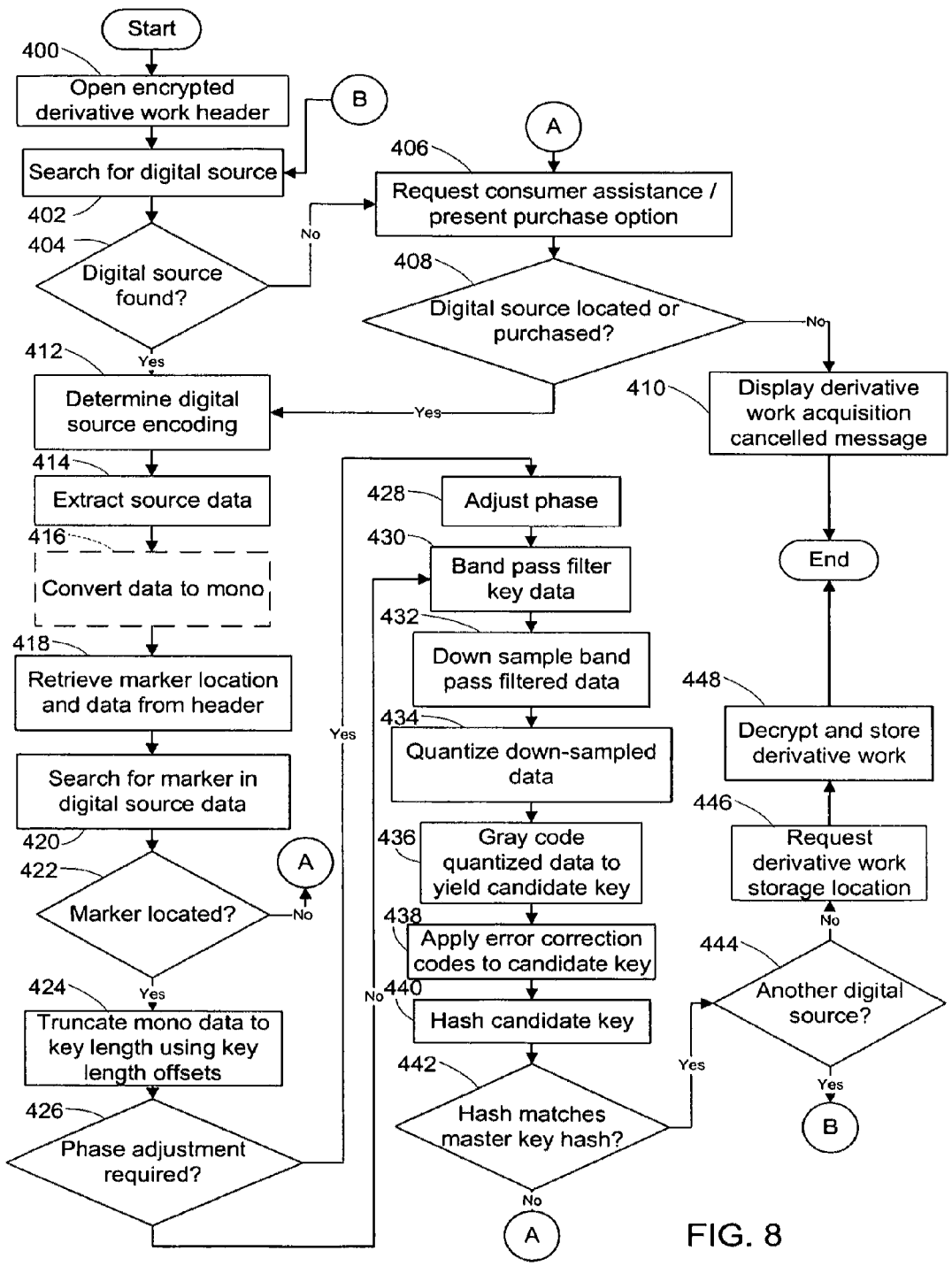
FIG. 8 is a flow chart illustrating principal steps in accordance with one embodiment of the invention of a method of decrypting a derivative work that was encrypted using the method shown in FIG. 2.

The encrypted derivative work header 30 also stores, for each master key created to encrypt the derivative work: a digital source ID 302 stored in the digital source ID database 28; a marker location 304, which stores the marker location stamp as described above; a copy of the marker data 306 in its entirety; the key length in PCM samples, for example, and any offsets 308 that may be used to locate the key with respect to any predetermined point in, or in relation to, the marker 306; the error correction codes 310 used to correct decryption keys, as will be explained below in more detail with reference to FIG. 8; all encryption methods 312 used in conjunction with the encryption key to encrypt the derivative encrypted work 32, as will be explained below in more detail with reference to FIG. 7; and, the master key hash 314. As seen this entire set of data 302-314 is recorded for each digital source used to encrypt the derivative encrypted work 32.

FIG. 7 is a schematic diagram visually illustrating an encrypted derivative work 32 in accordance with one embodiment of the invention. In this embodiment, each master key generated in accordance with the method described above with reference to FIG. 2 is applied in sequence to encrypt the derivative work using at least one encryption method with each master key. In accordance with one embodiment of the invention, two or more encryption methods are applied to the entire derivative work using each master key(s). Exemplary encryption methods include:
addition modulo $2^{32}$;
exclusive-OR (XOR, which is addition modulo 2);
subtraction modulo $2^{64}$;
circular left rotation of 256 bits;
addition modulo $2^{64}$;
circular right rotation of 256 bits;
subtraction modulo $2^{32}$; and
exclusive-OR.

Any one or more of these methods may be applied in any order using each master key. The encryption methods 312 and their order of application are recorded in the encrypted derivative work header 30, as described above, so they can be applied in a reverse order (and opposite operation) to decrypt the encrypted derivative work 32 as will be explained below with reference to FIG. 8. It must be understood that the encryption operations detailed above are exemplary only and any encryption algorithm may be used instead of, or in addition to, those set out. The net effect of the encryption method graphically illustrated in FIG. 7 is a layered encryption that can be referred to as an "encryption onion". Although for the purpose of illustration the size of the encrypted derivative work 32 is shown to increase with each encryption operation, it will be understood that this is not the case and the size of the encrypted derivative work 30 remains substantially constant after each encryption operation.

FIG. 8 is a flow chart illustrating principal steps in accordance with one embodiment of the invention of a method of decrypting an encrypted derivative work 32 that was encrypted using the method described above with reference to FIG. 2. When a consumer 50 indicates a desire to acquire an encrypted derivative work 32, the derivative work service server 22 examines the encrypted derivative work database 27 to extract the encrypted work header ID 300, which is used to open (400) the encrypted derivative work header 30. The derivative work service server 22 then downloads the encrypted derivative work header 30 to the consumer app 26. After the encrypted derivative work header 30 is downloaded, the consumer app 26 decrypts it and extracts the digital source IDs 302 from the decrypted header. The digital source IDs 30 are used to consult the digital source ID database 28 to retrieve the digital source identifiers required to locate corresponding digital sources on the consumer system 52. The consumer app 26 then performs a fuzzy search (402) for one of the corresponding digital sources amongst all of the digital sources 56 stored on memory 52. The fuzzy search is used because different digital sources created from the same source art work are sometimes identified slightly differently. If the fuzzy search does not locate (404) the corresponding digital source, known technology is used to present the consumer 50 with an option to provide assistance (drag and drop the copy of the digital source to a designated location, for example) or to purchase the missing digital source using a link obtained from the derivative work service server 22. It is then determined (408) whether the corresponding digital source was located or purchased. If not, the consumer 50 is not permitted to continue with the acquisition of the derivative work 32, a cancellation message is displayed 410 and the process ends.

If the corresponding digital source is located by the fuzzy search (404) or the consumer 50, or purchased by the consumer 50 (408), the consumer app 26 determines the digital source encoding (412) and extracts the digital source data (414). If required, the digital source data is then converted to mono (416) as described above with reference to FIG. 2. The marker location stamp 304 and the marker data 306 are then retrieved (418) from decrypted header, and a search of the digital source mono data is performed to locate the marker (422). If the marker is not located, it is assumed that the search (402) or the consumer 50 located the wrong digital source and the process recommences at (406). However, if the marker is located (422), the mono data is truncated to key length using the master key length and any required offsets 308 extracted from the decrypted header-. It is then determined (426) whether a key data phase adjustment is required. It has been observed that the source data extracted from one digital source may be 180° out of phase with that of another, depending on the digital source, the encoding algorithm used, or other factors. If this is the case, a phase adjustment (428) is required. The phase adjustment is accomplished by reversing the sign of each PCM sample. If not, the key data is band pass filtered (430), down sampled (432), quantized (434) and optionally Gray coded (436), all as described above with reference to FIG. 2 to yield a candidate key. The error correction codes 312 are then extracted from the encrypted derivative work header 30 and applied (438) to the candidate key to correct bit discrepancies. The hash algorithm is then applied (440) to the corrected candidate key and the resulting hash is compared with the master key hash 314 extracted from the decrypted header. If the hashes do not match, there is some anomaly in the corresponding digital source that prevents the generation of the required decryption key, in which case the consumer is notified, and the process repeats from (406). If the hashes match, the corrected candidate key is stored for subsequent use by the decryption process. It is then determined (444) if the encrypted derivative work header 30 contains another digital source ID 302. If so, the process repeats from (402). If not, the consumer 50 is requested (446) to provide a desired derivative work storage location, which may be any non-volatile memory available to the consumer system 52. The encrypted derivative work 32 is then downloaded by the consumer app 26 and the encryption methods 312 are applied in a reverse order (and opposite operation) and in a reverse key order to decrypt (448) the encrypted derivative work 32, which is stored on the consumer system 52 after it is decrypted. In one embodiment of the invention, the encrypted derivative work 32 is decrypted piece-wise in manageable chunks (1 Kb, for example) and written piece-wise to the specified storage location.

Figure 9:
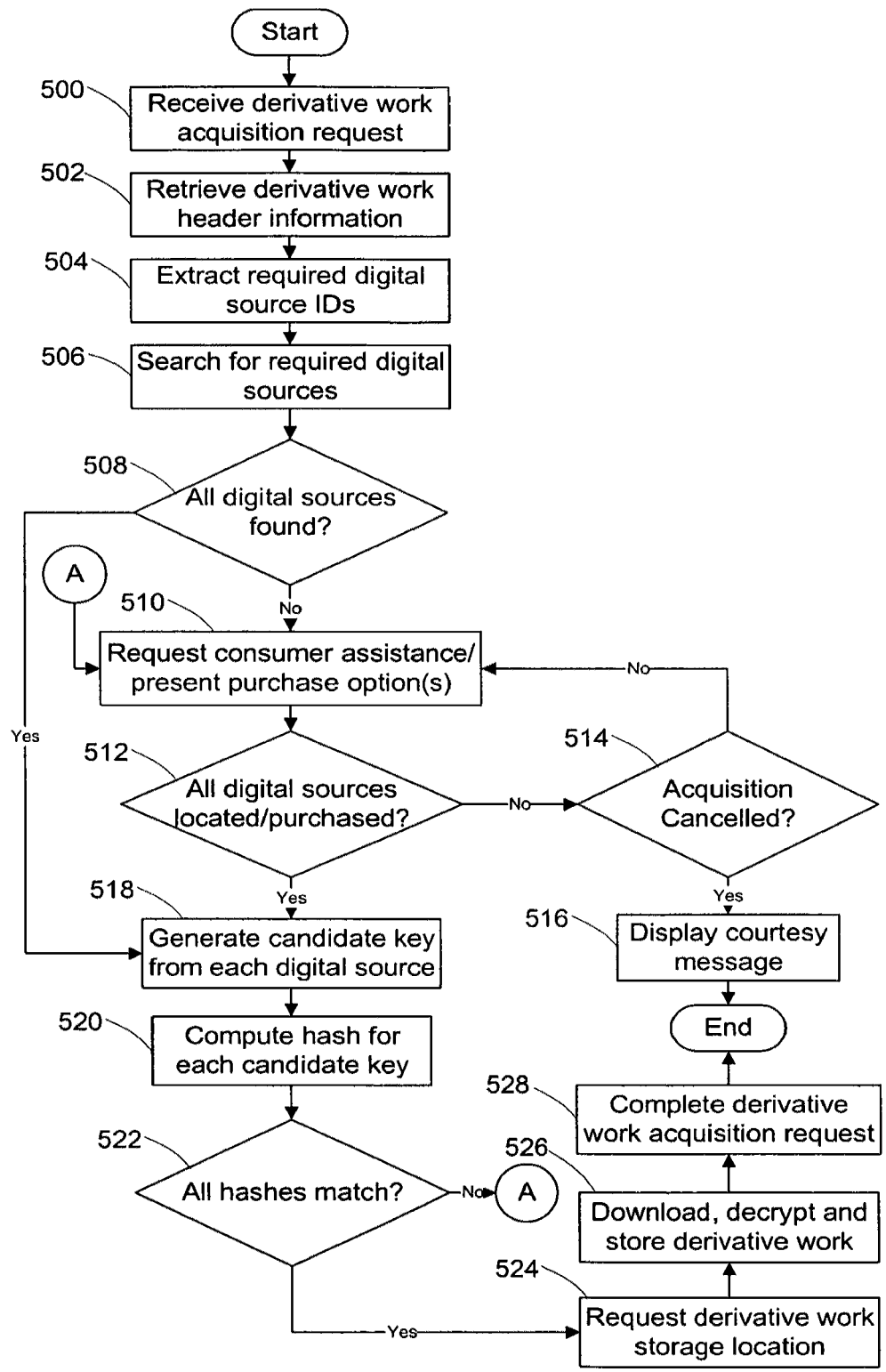
FIG. 9 is a flow chart characterizing principal steps performed to ensure consumer satisfaction after a consumer has expressed a desire to acquire a derivative work encrypted using the methods in accordance with the invention.

FIG. 9 is a flow chart characterizing principal steps performed to ensure consumer satisfaction after a consumer 50 has expressed a desire to acquire an encrypted derivative work 32. When the derivative work service server 22 receives (500) a derivative work acquisition request form the consumer app 26 (which may be a request to purchase an encrypted derivative work 32 or a request for a free download) the derivative work service server 22 uses the derivative work ID to query the derivative work header database 27 in order to locate and retrieve the encrypted derivative work header 30, which is passed to the consumer app 26. The derivative work service server 22 also extracts (504) each digital source ID 302 from the encrypted derivative work header 30. The derivative work service server then uses the digital source ID to query the digital source ID database 28 to retrieve the digital source identifiers associated with each digital source ID 302. The digital source identifiers are also passed to the consumer app 26, which performs a fuzzy search of the consumer system 52 for each digital source required to decrypt the encrypted derivative work 32.

When the search completes it is determined (508) if all digital sources have been found. If not, the consumer app 26 requests (510) assistance from the consumer 50 as described above with reference to FIG. 8 and determines (512) if all of the required digital sources have been located or purchased. If not, the consumer app presents (514) an option to the consumer 50 to cancel the acquisition. If the consumer 50 cancels the acquisition, a courtesy message is displayed inviting the consumer to try another acquisition, and the process ends. However, if all digital sources are located, the consumer app 26 generates a corrected candidate key from each digital source and computes a hash of each corrected candidate key, as described above with reference to FIG. 8. The consumer app 26 compares the corrected candidate key hashes with the master key hashes 314 stored in the encrypted derivative work header 30. If all hashes do not match, the consumer app 26, repeats the process from (510) for any digital sources that failed to generate a corrected candidate key that matches its corresponding master key. If all the hashes match, a billing transaction, if required, is performed. The consumer app 26 requests (524) a derivative work storage location from the consumer 50, and requests that the derivative work service server 26 stream down the encrypted derivative work 32. As the encrypted derivative work is streamed down, the consumer app decrypts it (526) by referring to the key order and the decryption methods stored in the decrypted header, as described above with reference to FIG. 8, and stores derivative work in the location specified by the consumer 50. In one embodiment of the invention, the consumer app 26 decrypts and stores the encrypted derivative work 32 piecewise, as described above. The consumer app completes the acquisition request (528) by advising the consumer 50 that the download is complete.

Although the processes described above have been illustrated by way of example with reference to sound recordings, it should be understood that the system and methods described above can be used for the encryption of any digital file, including 3GP, ASF, AVI, FLV, MOV, MPG, MP4, JPG, GIF, PNG, TIF, plain text, or any other file format. It should also be understood that although the processes described above are performed in the time domain, the methods in accordance with the invention may also be practiced in the frequency domain without departing from the spirit or the scope of the invention.

It should therefore be understood that the embodiments described above are intended to be exemplary only, and the scope of the invention is to be limited solely by the scope of the appended claims.

We claim:

1. A method of encrypting a derivative work using encryption keys respectively generated from respective digital sources used to create the derivative work, comprising:
   obtaining machine-readable input that identifies each of the digital sources used to create the derivative work;
   extracting source data from each of the digital sources identified by the machine-readable input, the source data being a native, uncompressed digital encoding of the respective digital sources;
   selecting a portion of the source data extracted from each of the identified digital sources;
   locating a data sequence in the respective selected portions of the source data that is unique within a predetermined range of the respective selected portions of the source data to serve as a marker in each of the respective selected portions of the source data, the marker providing a reference point for selecting source data to be extracted from a corresponding digital source when the encrypted derivative work is to be decrypted;
   storing, for each of the respective digital sources, the marker and a location stamp for the marker in an encrypted derivative work header;
   computing, for each of the respective digital sources, at least one offset from a predetermined point in the marker to a predetermined point in the selected portion of the source data;
   storing, for each of the respective digital sources, the at least one offset in the encrypted derivative work header;
   generating the respective encryption keys from the respective selected portions of the source data; and
   encrypting the derivative work by sequentially applying the respective encryption keys to the entire derivative work.

2. The method as claimed in claim 1 further comprising storing, for each of the respective digital sources, a length of the selected portion of the source data in the encrypted derivative work header.

3. The method as claimed in claim 1 wherein prior to selecting the portion of the source data or locating the marker, the method further comprises converting the source data from stereo to mono.

4. The method as claimed in claim 1 wherein generating the respective encryption keys using the selected source data comprises:
   band pass filtering the selected portion of the source data to remove frequencies that are higher or lower than a predetermined frequency range;
   down sampling the band pass filtered data using a decimation filter; and
   quantizing the down sampled data.

5. The method as claimed in claim 4 further comprising Gray coding the quantized data to generate the respective encryption keys.

6. The method as claimed in claim 4 wherein quantizing the down sampled data comprises use of a linear quantizer.

7. The method as claimed in claim 4 further comprising computing a hash of the respective encryption keys and storing the respective hashes in the encrypted derivative work header.

8. The method as claimed in claim 4 further comprising computing error correction codes used to correct respective decryption keys generated from digital sources possessed by a consumer who wishes to acquire the derivative work, and storing the respective error correction codes in the encrypted derivative work header.

9. The method as claimed in claim 1 wherein sequentially applying the respective encryption keys further comprises using a respective plurality of encryption methods to apply each encryption key to encrypt the derivative work, and storing the respective plurality of encryption methods in the encrypted derivative work header.

10. A system for encrypting and decrypting a derivative work, comprising:
    a derivative work service server with non-volatile memory, the derivative work service server being connected to a public network and accessible by mix artists and consumers;
    the derivative work service server non-volatile memory adapted to store encrypted versions of derivative works created by mix artists and uploaded to the derivative work service server using an artist app stored on non-volatile memory of respective computer systems operated by respective mix artists, the artist app comprising machine-executable code that permits any one of the respective mix artists to upload a derivative work to the non-volatile memory of the derivative work service server, which derivative work is encrypted using encryption keys that are respectively generated from source data extracted from respective digital sources identified by the mix artist as the digital sources used to create the derivative work, the artist app comprising program instructions that open a copy of the respective digital sources and extract source data from each digital source, program instructions that locate a start point used to generate a respective encryption key from the source data extracted from each of the respective digital sources, and program instructions that create the respective encryption keys from the extracted source data of the respective digital sources, the source data being a native, uncompressed digital encoding of the respective digital sources; and
    the derivative work service server being further adapted to download encrypted versions of the derivative works stored in the derivative work service server non-volatile memory to a consumer app stored on respective computer systems operated by the respective consumers, the consumer app comprising machine-executable code that permits any one of the respective consumers to acquire and decrypt the encrypted derivative work, provided that the consumer is in possession of a digital source created from a same source art work as each digital source used to encrypt the derivative work.

11. The system as claimed in claim 10 wherein the machine-executable code of the artist app further comprises:
    program instructions that encrypt the derivative work by sequentially applying the respective encryption keys to the entire derivative work.

12. The system as claimed in claim 11 wherein the machine-executable code of the consumer app further comprises:
    program instructions that permit the consumer to browse the encrypted derivative works available on the derivative work service server.

13. The system as claimed in claim 12 wherein the machine-executable code of the consumer app further comprises program instructions that display an option to permit the consumer to purchase any digital source required to decrypt the encrypted derivative work.

14. The system as claimed in claim 12 wherein the machine-executable code of the consumer app further comprises:
  program instructions that open an encrypted derivative work header associated with an encrypted derivative work acquired by the consumer;
  program instructions that extract source data from each digital source identified in the derivative work header as a digital source required to decrypt the encrypted derivative work;
  program instructions that select a portion of the source data extracted from each digital source using a marker and an offset extracted from the encrypted derivative work header;
  program instructions that generate the respective decryption keys from the selected portions of the source data;
  program instructions that apply each decryption key in a specified order to the encrypted derivative work to decrypt the encrypted derivative work.

15. The system as claimed in claim 14 further comprising program instructions of the consumer app that extract error correction codes from the encrypted derivative work header and apply the error correction codes to each corresponding decryption key before the respective decryption keys are used to decrypt the encrypted derivative work.

16. The system as claimed in claim 14 further comprising program instructions of the consumer app that compute a hash of the respective decryption keys and compare the respective hashes of the respective decryption keys with respective hashes of the respective encryption keys used to encrypt the encrypted derivative work.

17. The system as claimed in claim 14 further comprising program instructions of the consumer app that decrypt the encrypted derivative work as it is streamed from the derivative work service server.

* * * * *